(12) United States Patent
Egedal et al.

(10) Patent No.: US 8,334,607 B2
(45) Date of Patent: Dec. 18, 2012

(54) CONTROL OF THE ROTATIONAL SPEED OF A WIND TURBINE WHICH IS IMPEDED TO EXPORT ELECTRICAL POWER TO AN ELECTRICITY NETWORK

(75) Inventors: Per Egedal, Herning (DK); Ole Kjaer, Grindsted (DK)

(73) Assignee: Siemens Aktiengesellschaft, München (DE)

( * ) Notice: Subject to any disclaimer, the term of this patent is extended or adjusted under 35 U.S.C. 154(b) by 435 days.

(21) Appl. No.: 12/632,233

(22) Filed: Dec. 7, 2009

(65) Prior Publication Data

US 2010/0140941 A1    Jun. 10, 2010

(30) Foreign Application Priority Data

Dec. 8, 2008 (EP) .................................... 08021302

(51) Int. Cl.
*F03D 9/00* (2006.01)
*H02P 9/04* (2006.01)

(52) U.S. Cl. ........................................................ 290/44
(58) Field of Classification Search ...................... 290/44
See application file for complete search history.

(56) References Cited

U.S. PATENT DOCUMENTS

| | | | | |
|---|---|---|---|---|
| 4,160,170 A * | 7/1979 | Harner et al. | ................ | 290/44 |
| 4,193,005 A | 3/1980 | Harner et al. | ................ | 290/44 |
| 4,414,871 A * | 11/1983 | Trout | ................ | 82/165 |
| 4,607,203 A * | 8/1986 | Bohm et al. | ................ | 318/687 |
| 6,137,187 A * | 10/2000 | Mikhail et al. | ................ | 290/44 |
| 6,420,795 B1 * | 7/2002 | Mikhail et al. | ................ | 290/44 |
| 6,639,328 B2 * | 10/2003 | Wacknov | ................ | 290/52 |
| 6,670,721 B2 * | 12/2003 | Lof et al. | ................ | 290/44 |
| 6,784,565 B2 * | 8/2004 | Wall et al. | ................ | 290/52 |
| 6,787,933 B2 * | 9/2004 | Claude et al. | ................ | 290/52 |
| 6,812,586 B2 * | 11/2004 | Wacknov et al. | ................ | 290/52 |
| 6,847,128 B2 * | 1/2005 | Mikhail et al. | ................ | 290/44 |
| 6,856,039 B2 * | 2/2005 | Mikhail et al. | ................ | 290/44 |
| 7,042,110 B2 * | 5/2006 | Mikhail et al. | ................ | 290/44 |
| 7,095,131 B2 * | 8/2006 | Mikhail et al. | ................ | 290/44 |
| 7,138,781 B2 * | 11/2006 | Murray et al. | ................ | 318/400.04 |
| 7,339,355 B2 * | 3/2008 | Erdman et al. | ................ | 322/29 |
| 7,372,174 B2 * | 5/2008 | Jones et al. | ................ | 290/44 |
| 7,432,686 B2 * | 10/2008 | Erdman et al. | ................ | 322/44 |
| 7,511,385 B2 * | 3/2009 | Jones et al. | ................ | 290/43 |
| 7,569,944 B2 * | 8/2009 | Oohara et al. | ................ | 290/44 |
| 7,656,052 B2 * | 2/2010 | Jones et al. | ................ | 290/43 |
| 7,692,321 B2 * | 4/2010 | Jones et al. | ................ | 290/43 |
| 7,755,209 B2 * | 7/2010 | Jones et al. | ................ | 290/44 |

(Continued)

FOREIGN PATENT DOCUMENTS

EP    1 651 865 B1    11/2006

(Continued)

*Primary Examiner* — Pedro J Cuevas

(57) ABSTRACT

A rotational speed controlling device for a wind turbine is provided. The controlling device includes a first input node for receiving a first signal, indicative of an actual rotational speed of the rotor, a second input node for receiving a second signal, indicative of a reference rotational speed for the rotor, a detection unit for detecting a defective operational state in which the wind turbine is impeded to export electrical power to an electricity network, a control unit for providing a reference signal for a characteristic operational parameter of the wind turbine based on the first signal and the second signal, and a pulse generator adapted to send a kick pulse to an integral control element of the control unit in response to the detection of the defective operational state. The characteristic operational parameter is indicative of the rotational speed of the rotor.

20 Claims, 3 Drawing Sheets

U.S. PATENT DOCUMENTS

| | | | |
|---|---|---|---|
| 8,030,791 B2 * | 10/2011 | Lang et al. | 290/44 |
| 8,093,740 B2 * | 1/2012 | Oohara et al. | 290/44 |
| 8,097,971 B2 * | 1/2012 | Ichinose et al. | 290/44 |
| 8,129,851 B2 * | 3/2012 | Ichinose et al. | 290/44 |
| 8,129,936 B2 * | 3/2012 | Becker et al. | 318/802 |
| 2002/0105189 A1 * | 8/2002 | Mikhail et al. | 290/44 |
| 2002/0157881 A1 * | 10/2002 | Bakholdin et al. | 180/65.2 |
| 2002/0175522 A1 * | 11/2002 | Wacknov et al. | 290/52 |
| 2002/0190695 A1 * | 12/2002 | Wall et al. | 322/17 |
| 2002/0195821 A1 * | 12/2002 | Wacknov | 290/12 |
| 2003/0015873 A1 * | 1/2003 | Khalizadeh et al. | 290/7 |
| 2004/0094964 A1 * | 5/2004 | Mikhail et al. | 290/44 |
| 2004/0119292 A1 * | 6/2004 | Datta et al. | 290/44 |
| 2004/0207208 A1 * | 10/2004 | Mikhail et al. | 290/44 |
| 2005/0012339 A1 * | 1/2005 | Mikhail et al. | 290/44 |
| 2005/0253396 A1 * | 11/2005 | Mikhail et al. | 290/44 |
| 2006/0108962 A1 * | 5/2006 | Murray et al. | 318/610 |
| 2007/0108771 A1 * | 5/2007 | Jones et al. | 290/44 |
| 2007/0187955 A1 * | 8/2007 | Erdman et al. | 290/44 |
| 2008/0007121 A1 * | 1/2008 | Erdman et al. | 307/47 |
| 2008/0277938 A1 * | 11/2008 | Oohara et al. | 290/44 |
| 2009/0146426 A1 * | 6/2009 | Jones et al. | 290/44 |
| 2009/0146500 A1 * | 6/2009 | Jones et al. | 307/82 |
| 2009/0261589 A1 * | 10/2009 | Oohara et al. | 290/44 |
| 2009/0278354 A1 * | 11/2009 | Ichinose et al. | 290/44 |
| 2010/0025995 A1 * | 2/2010 | Lang et al. | 290/44 |
| 2010/0079104 A1 * | 4/2010 | Becker et al. | 318/802 |
| 2010/0201330 A1 * | 8/2010 | Ichinose et al. | 322/61 |
| 2011/0057444 A1 * | 3/2011 | Dai et al. | 290/44 |
| 2011/0101689 A1 * | 5/2011 | Larsen et al. | 290/44 |
| 2011/0221194 A1 * | 9/2011 | Egedal et al. | 290/44 |

FOREIGN PATENT DOCUMENTS

| | | |
|---|---|---|
| EP | 1 819 023 A2 | 8/2007 |
| EP | 1903213 A2 | 3/2008 |

* cited by examiner

CONTROL OF THE ROTATIONAL SPEED OF A WIND TURBINE WHICH IS IMPEDED TO EXPORT ELECTRICAL POWER TO AN ELECTRICITY NETWORK

CROSS REFERENCE TO RELATED APPLICATIONS

This application claims priority of European Patent Office application No. 08021302.8 EP filed Dec. 8, 2008, which is incorporated by reference herein in its entirety.

FIELD OF INVENTION

The present invention relates to the field of wind turbines for generating electric power. In particular, the present invention relates to a device and to a method for controlling the rotational speed of a rotor of a wind turbine in an operational situation, in which the wind turbine is impeded to export electrical power to an electricity network being connected to the wind turbine. Further, the present invention relates to a wind turbine comprising the above mentioned rotational speed controlling device and to a computer program for controlling the above mentioned rotational speed controlling method.

ART BACKGROUND

Wind energy is increasingly recognized as a viable option for complementing and even replacing other types of energy sources such as for instance fossil fuels. However, the control of the operation of a wind turbine is often very sensitive because a wind turbine is typically exposed to ever-changing ambient conditions which may cause extreme mechanical loads for instance to the rotor and to the mast of the wind turbine.

Further, the operation of a wind turbine strongly depends on the availability and the electrical power absorption capability of the electricity network the wind turbine is connected to. Specifically, when an electricity network fault happens near a wind turbine, the voltage of the electricity network will be typically very low. This makes it impossible for the generator of the wind turbine to export the produced electrical power to the electricity network. The result is an increasing of the rotational speed of the rotor of the wind turbine with the risk of a dangerous over speed situation.

In order to avoid an over speed situation it is known to control the rotational speed of a speed controller of the wind turbine for instance by setting the pitch angle of the blades of the rotor to an angular position being different from the optimal blade pitch angle when the wind turbine is operated in an error-free operational state. Thereby, it is essential that the speed controller is able to react quickly on the electricity network fault. Further, an emergency stop of the wind turbines operation can be necessary due to the fact that without voltage on the electricity network, a blade pitch angle control system can only be operated in the emergency mode, where it is changing the blade pitch angle with a constant speed. However, pitching with a constant speed causes large loads on the tower and yaw system of the wind turbine.

EP 1 651 865 B1 describes a method for regulating the pitch of blades of a wind turbine on detection of a malfunction of the electricity network. Thereby, the pitch is regulated continuously or in steps in order to reduce the power production of the wind turbine and thus protect the components of the wind turbine from overheating.

EP 1 819 023 A2 solves the problem of overheating components of a wind turbine in case of an electricity network malfunction by switching the power output from the turbine to a dump load as soon as the malfunction has been rectified or until the wind turbine has been stopped in a controlled manner.

There may be a need for providing a control for the rotational speed of a wind turbine which is impeded to export electrical power to an electricity network, wherein the control changes a characteristic operational parameter being indicative for the rotational speed of the rotor in such a manner that mechanical loads on the tower and yaw system of the wind turbine can be reduced.

SUMMARY OF THE INVENTION

This need may be met by the subject matter according to the independent claims. Advantageous embodiments of the present invention are described by the dependent claims.

According to a first aspect of the invention there is provided a device for controlling the rotational speed of a rotor of a wind turbine for feeding electrical power into an electricity network. The provided rotational speed controlling device comprises (a) a first input node for receiving a first signal being indicative for an actual rotational speed of the rotor, (b) a second input node for receiving a second signal being indicative for a reference rotational speed for the rotor, (c) a detection unit for detecting a defective operational situation in which the wind turbine is impeded to export electrical power to the electricity network, (d) a control unit for providing a reference signal for a characteristic operational parameter of the wind turbine based on the first signal and based on the second signal, the characteristic operational parameter being indicative for the rotational speed of the rotor, wherein the control unit comprises a proportional control element and an integral control element, and (e) a pulse generator, which is connected to the detection unit and to the integral control element and which is adapted to send a kick pulse to the integral control element in response to the detection of the defective operational state.

The described rotational speed controlling device is based on the idea that by sending a kick pulse to the integral control element of the control unit, which represents a proportional plus integral controller (PI controller), the time rate of a change of the reference signal will be increased. This may mean that the magnitude of the change of the reference signal in response to the detection of the defective operational state will be much stronger as compared to known speed controllers having no pulse generator connecting an electricity network detection unit with the integral control element of a control element.

According to the basic principles of automatic control engineering, by changing the reference signal to a large extend the response time for adapting respectively changing the characteristic operational parameter of the wind turbine will be reduced significantly. This means that the rotational speed controlling device will cause the wind turbine to quickly respond to the detection of the defective operational state by adapting the reference signal for the characteristic operational parameter in such a manner, that the rotational speed of the rotor will be adapted accordingly. Thereby, damages to the wind turbine in particular in connection with an over speed situation may be avoided effectively.

The described kick pulse may be applied to the integral control element immediately after the defective operational state has been detected. This ensures a fast response of the rotational speed controlling device to the detection of the defective operational state.

The defective operational state may be associated with at least one component of the wind turbine and/or may be associated with the condition of the electricity network. For instance the frequency of the electrical power being provided by the wind may be out of tune with respect to the frequency of the electricity network. Such a mistuning may be caused for instance by a trip of the wind turbines frequency converter. However, also other failures, which occur in other hardware of the wind turbine, may suddenly make it impossible for the wind turbine to exports its electrical power to the electricity network.

The described rotational speed controlling device may be realized by means of a computer program respectively by means of software. However, the rotational speed controlling device may also be realized by means of one or more specific electronic circuits respectively hardware. Furthermore, the control system may also be realized in a hybrid form, i.e. in a combination of software modules and hardware modules.

According to an embodiment of the invention the rotational speed controlling device further comprises a third input node for connecting the device to the electricity network. Thereby, (a) the detection unit is connected to the third input node and (b) the detection unit is adapted for detecting an electrical failure on the electricity network. This may provide the advantage that a malfunction of the electricity network, which makes it impossible for the wind turbine to export its generated electrical power, can be detected in a quick and reliable way.

According to a further embodiment of the invention the detection unit comprises a voltage detector. This may provide the advantage that voltage drops of the electricity network can easily be detected by the detection unit. Since most malfunctions of electricity networks are associated with voltage drops, the voltage detector will be able to detect almost any type of failures of the electricity network.

In this respect it is mentioned that the electrical power P is associated with the voltage U and the current I by the known equation. $P=U \cdot I$. Therefore, if the voltage U is very low, then the power P will also be low, because the current I will be saturated to a nominal current.

It has to be mentioned that the voltage detector may not only be able to detect voltage drops. The voltage detector may also be sensitive to voltage dips. This means that the voltage detector may not only be sensitive to the voltage level but also to the time rate of change of the voltage level. Thereby, an even higher sensitivity of the voltage detector may be achieved. This holds in particular for short fluctuations of the voltage level of the electricity network, during which it is not possible for the wind turbine to export its generated electric power.

As has already been mentioned above, when the voltage of the electricity network drops below a predefined threshold value, the wind turbine may not be able any more to export electrical power to the electricity network. As a consequence, the efficiency of the wind turbine with respect to its ability to extract energy from a surrounding wind flow has to be decreased in order to avoid an over speed situation. An over speed situation, which is outside the mechanical and/or electrical specifications of the wind turbine, may cause significant damage to the wind turbine. Therefore, in case of a voltage drop and/or a voltage dip of the electricity network the characteristic operational parameter of the wind turbine should be changed in such a manner that the rotational speed of the wind turbines rotor will be reduced.

By preventing the wind turbine from passing over in an over speed situation by means of the described rotational speed controlling device the maximum tower bending moment can be reduced by approximately 50% as compared to the usage of a known rotational speed controlling device having no kick pulse causing a faster response of the wind turbine to the defective operational state. Further, when the described rotational speed controlling device is used the yaw moment can be reduced by approximately 30%. These improvements of the mechanical loads, which are caused by the described kick pulse, have been shown by the inventor by means of numerical simulations of the behavior of a concrete wind turbine.

According to a further embodiment of the invention the characteristic operational parameter of the wind turbine is a blade pitch angle of at least one blade of the rotor. This may provide the advantage that the degree of efficiency of the wind turbine can be reduced easily simply by adjusting the blade pitch angle to a position being different with respect to the optimal blade pitch angle.

In particular, when a voltage drop in the electricity network voltage is detected by the detection unit, the kick pulse will be sent to the integral control element of the PI-controller. The following integration of this kick pulse leads to a step on the integrator output which forces a fast movement of the blade pitch angle.

Applying the pitch kick has the same effect on the reference signal, which in this embodiment represents a blade pitch reference output, as a large negative speed error. It therefore acts to further reduce the rotational speed of the rotor and thus effectively prevents an over speed situation.

According to a further embodiment of the invention the pulse generator is adapted to send an inverse kick pulse to the integral control element. Such an inverse kick pulse may be generated by the pulse generator if an electrical failure on the electricity network, which has been detected by the detection unit, has been overcome within a predefined time interval after the electrical failure has been detected. The predefined time interval may have a duration of between 0.02 s and 10 s. An inverse pitch kick may be send for instance if the predefined time duration is below 1.5 s.

Generally speaking, if the electricity network malfunction lasts only for a short duration of time, the described rotational speed controlling device will not issue a stop command for shutting down the operation of the wind turbine. Instead the described inverse kick pulse is sent to the integral control element of the PI controller when the electricity network condition has returned to normal. This forces a negative step on the PI controller integral element and will eliminate the kick pulse that was sent when the electricity network fault occurred.

In this respect it is pointed out that after the issue of the inverse kick pulse the described rotational speed controlling device will remain in operation. Therefore, if the malfunction of the electricity network lasts only for a comparatively short duration of time, a need for a new start up procedure of the rotational speed controlling device is eliminated.

According to a further embodiment of the invention the rotational speed controlling device further comprises a timer unit, which is connected to the detection unit and which is adapted to provide a stop command signal to other components of the device. This may provide the advantage that if the defective operational state lasts for a time duration, which is longer than a predefined threshold of for instance 100 ms, the wind turbine can be shut down in a defined manner. This may facilitate a later restart of the wind turbine.

In particular, the stop command signal may cause a minimum blade pitch angle to be initiated to the actual blade pitch angle and increase the minimum blade pitch and as a function of time since the stop command was initiated. Thereby, a blade pitch angle of approximately 0° may be considered as to represent the optimal blade pitch angle when both the wind turbine and the electricity network are in an error free operational state in which the wind turbine is ready for producing a maximal electric power. By contrast thereto, a blade pitch angle of 90° may mean that the blade(s) of the rotor is (are) oriented perpendicular to the wind direction.

Further, the stop command signal may cause that, after the rotational speed has fallen below the reference rotational speed, the reference rotational speed is ramped down to zero. This may provide the advantage that the wind turbine can shut down its operation in a highly reliable way. This holds in particular for the adjustment of the blade pitch angle.

For ramping down the reference rotational speed appropriate hardware and/or software components may be used. Such appropriate components are well known by persons being skilled in the art of controlling the operational states of wind turbines. Therefore, for the sake of conciseness of this application no further details will be given about possible ways how such a ramping down can be realized.

According to a further embodiment of the invention the reference rotational speed of the rotor is (a) a time-independent rotational speed having a predefined nominal value, (b) a time-independent rotational speed having a zero value or (c) a time-dependent rotational speed having a predefined time dependency, which is started in response to the stop command signal.

The corresponding different second signals representing the different described reference rotational speeds may be selectively fed to the second input node via a controllable switch. This controllable switch may be connected directly or indirectly with the timer unit.

The predefined time dependency may be in particular a ramp function starting from the predefined nominal value and approaching the zero value. Thereby, any continuous function may be used. Probably the simplest function is a function having a constant slope. Such a function can also b called a ramp function.

According to a further embodiment of the invention the control unit comprises a subtracting unit for obtaining a rotational speed error by subtracting the first signal being indicative for the actual rotational speed from the second signal being indicative for the reference rotational speed. Further, the rotational speed error is provided to the proportional control element and to the integral control element. This may provide the advantage that the proportional control element and/or the integral control element may operate with a single electric variable. Thereby, this electric variable represents the actual rotational speed error.

According to a further aspect of the invention there is provided a wind turbine for generating electric power. The wind turbine comprises (a) a rotor having at least one blade, wherein the rotor is rotatable around a rotational axis and the at least one blade extends radial with respect to the rotational axis, (b) a generator being mechanically coupled with the rotor for generating electrical power from a rotational movement of the rotor, and (c) a device as described above for controlling the rotational speed of the rotor.

The described wind turbine is based on the idea that by embedding the above described rotational speed controlling device into a usual wind turbine, the wind turbine can quickly respond to the detection of a defective operational state by adapting the reference signal for the characteristic operational parameter in such a manner, that the rotational speed of the rotor will be adapted accordingly. Thereby, damages to the wind turbine in particular due to an over speed situation may be avoided effectively.

According to an embodiment of the invention the wind turbine further comprises an uninterruptible power supply which is connected to the device for controlling the rotational speed of the rotor. This may provide the advantage that the above described rotational speed controlling device may be able to control the wind turbines operation even during a fault of the electricity network.

According to a further aspect of the invention there is provided a method for controlling the rotational speed of a rotor of a wind turbine for feeding electrical power into an electricity network. The provided rotational speed controlling method comprises (a) receiving a first signal being indicative for an actual rotational speed of the rotor, (b) receiving a second signal being indicative for a reference rotational speed for the rotor, (c) detecting a defective operational situation in which the wind turbine is impeded to export electrical power to the electricity network, (d) providing a reference signal for a characteristic operational parameter of the wind turbine based on the first signal and based on the second signal, wherein the characteristic operational parameter is indicative for the rotational speed of the rotor, (e) sending a kick pulse from a pulse generator to an integral control element of a control unit, and (f) integrating the kick pulse such that the reference signal for the characteristic operational parameter of the wind turbine is changed in response to the detection of the defective operational state, wherein the change of the reference signal causes the rotor to change its rotational speed.

Also the described rotational speed controlling method is based on the idea that by sending a kick pulse to the integral control element the time rate of a change of the reference signal can be increased significantly. Thereby, the magnitude of the change of the reference signal in response to the detection of the defective operational state may be much stronger as compared to known speed controlling methods, which do not use a kick pulse in order to further stimulate the integral control element. Preferably, the integral control element may be a part of a control unit, which preferably also comprises a proportional control element.

According to a further aspect of the invention there is provided a computer program for controlling the rotational speed of a rotor of a wind turbine for feeding electrical power into an electricity network. The computer program, when being executed by a controlling device, is adapted for controlling the above described method.

As used herein, reference to a computer program is intended to be equivalent to a reference to a program element and/or to a computer readable medium containing instructions for controlling a computer system to coordinate the performance of the above described method.

The computer program element may be implemented as a computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 3 shows a diagram depicting a variation of a blade pitch angle for a rotor of a wind turbine in response to the detection of a malfunction of an electricity network the wind turbine is connected to.

DETAILED DESCRIPTION

Figure 1:
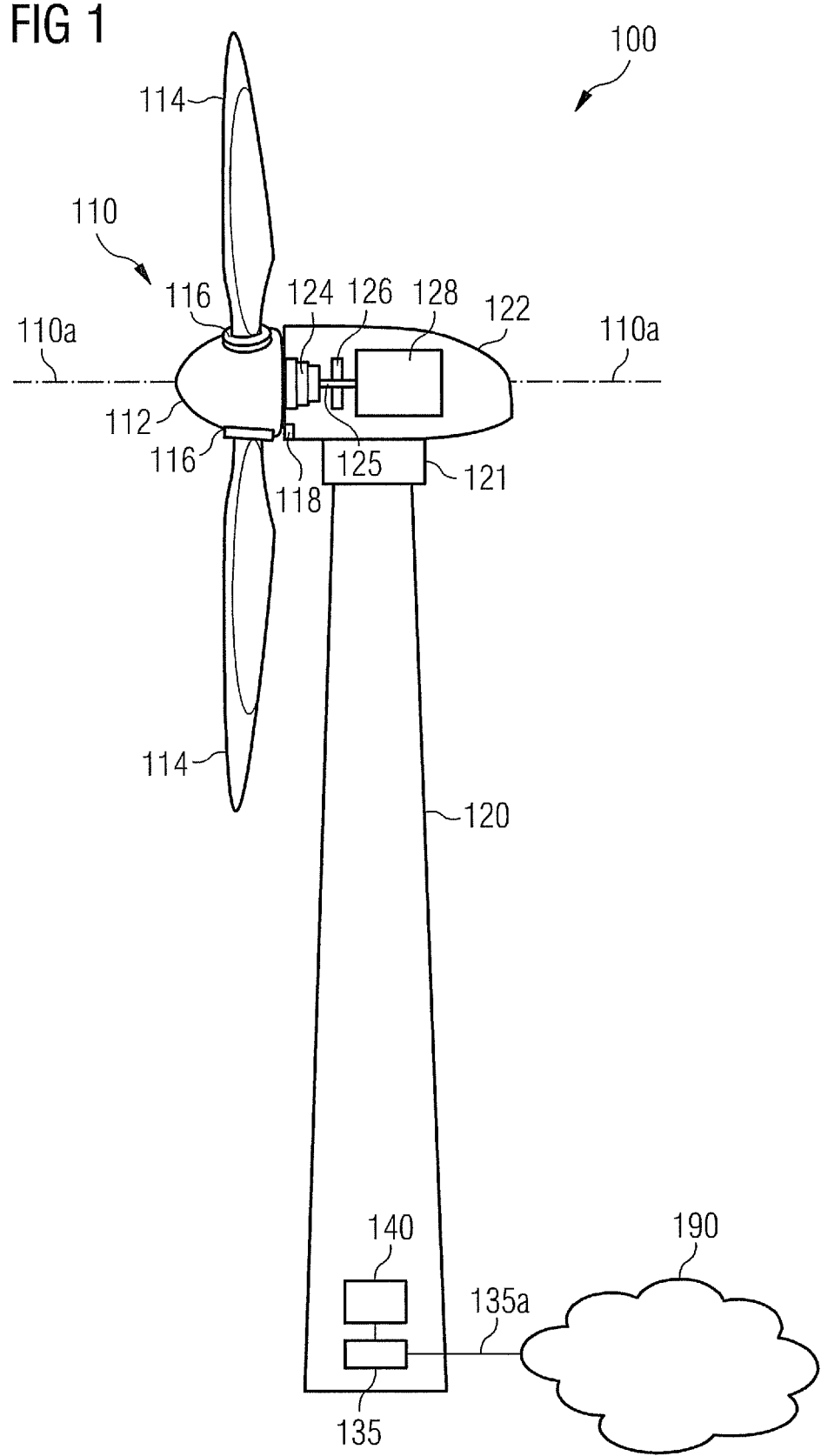
FIG. 1 shows a wind turbine comprising a rotational speed controlling device according to an embodiment of the present invention.

The illustration in the drawing is schematically. It is noted that in different figures, similar or identical elements are provided with the same reference signs or with reference signs, which are different from the corresponding reference signs only within the first digit.

FIG. 1 shows a wind turbine 100 according to a preferred embodiment of the invention. The wind turbine 100 comprises a mast 120, which is mounted on a non-depicted fundament. On top of the mast 120 there is arranged a housing 122. In between the mast 120 and the housing there is provided a rotor angle adjustment device 121, which is capable of rotating the housing 122 around a non depicted vertical axis, which is aligned with the longitudinal extension of the mast 120. By controlling the rotor angle adjustment device 121 in an appropriate manner it can be made sure, that during operation of the wind turbine 100 the housing 122 is always properly aligned with the current wind direction.

The wind turbine 100 further comprises a rotor 110 having three blades 114. In the perspective of FIG. 1 only two blades 114 are visible. The rotor 110 is rotatable around a rotational axis 110a. The blades 114, which are mounted at a driving collar 112, extend radial with respect to the rotational axis 110a.

In between the driving collar 112 and a blade 114 there is respectively provided a blade adjustment device 116 in order to adjust the blade pitch angle of each blade 114 by rotating the respective blade 114 around a non depicted axis being aligned parallel with the longitudinal extension of the blade 114. By controlling the blade adjustment device 116 the blade pitch angle of the respective blade 114 can be adjusted in such a manner, that depending on the current wind conditions a maximum wind power can be retrieved from the available wind power.

As can be seen from FIG. 1, within the housing there is provided a gear box 124 in order to convert the number of revolutions of the rotor 110 into a higher number of revolutions of a shaft 125, which is coupled in a known manner to a generator 128. Further, a brake 126 is provided in order to stop the operation of the wind turbine 100 for instance in case of an emergency and/or in case of strong wind conditions, which might harm the wind turbine 100.

The wind turbine 100 further comprises a rotational speed controlling device 140, which is connected in a non depicted manner to a rotational speed sensor 118, which in operation measures the rotational speed of the rotor 110. Further, according to the embodiment described here the rotational speed controlling device 140 is connected to an uninterruptible power supply 135, which itself is connected an electricity network 190 by means of a power line 135a. A further power line, which for the sake of clarity is not depicted in FIG. 1, connects the generator 128 with the electricity network 190. Via this non depicted power line the electrical power, which is produced by the wind turbine 100, is transferred to the electricity network 190.

Figure 2:
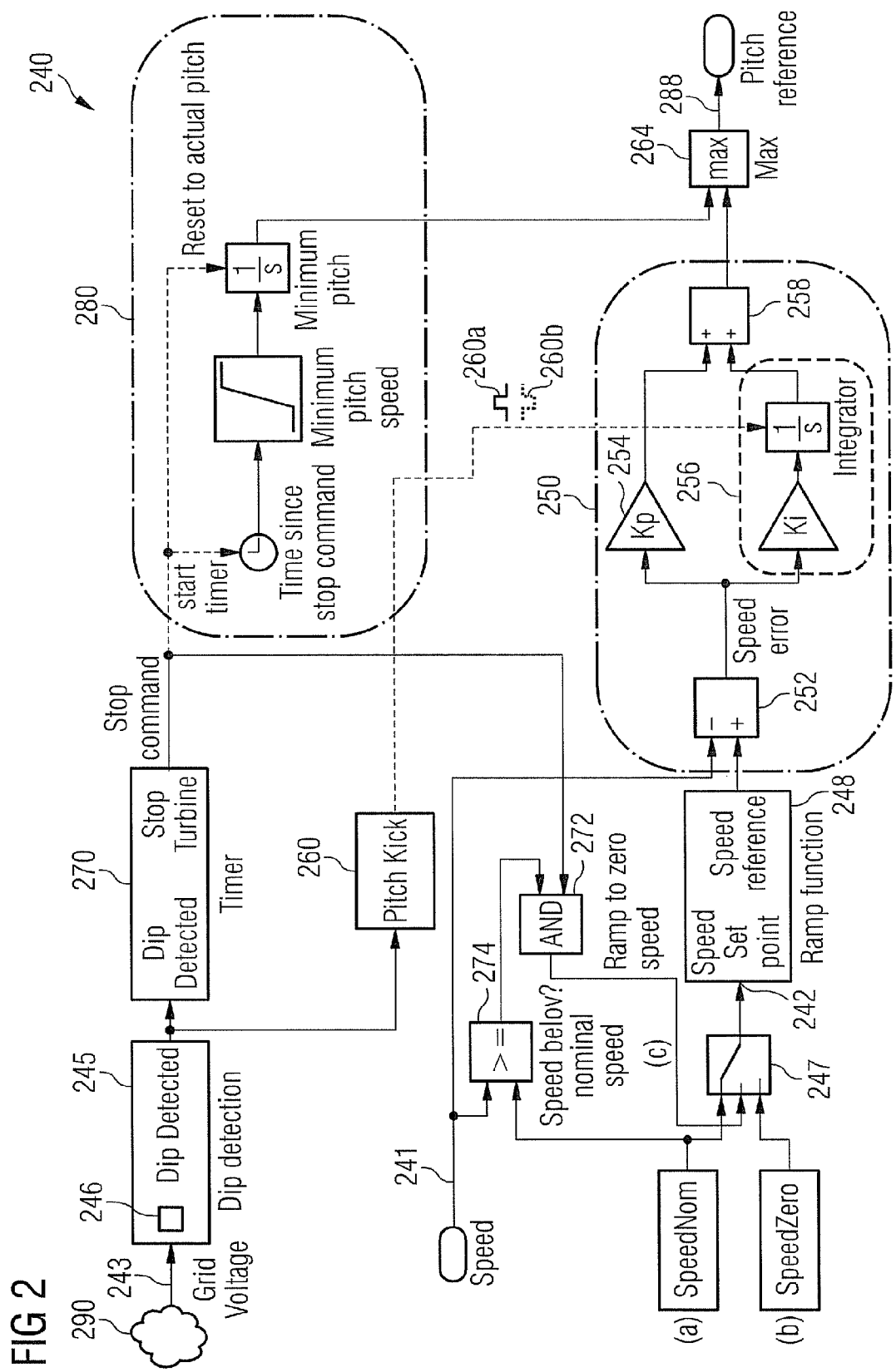
FIG. 2 shows a circuit diagram for a rotational speed controlling device, which comprises a generator for sending a kick pulse to an integral control element in response to a detection of a defective operational state in which the wind turbine is impeded to export electrical power to an electricity network.

FIG. 2 shows a circuit diagram for the rotational speed controlling device 140, which is now denominated with reference numeral 240. The rotational speed controlling device 240 comprises three input nodes. A first input node 241 is used for receiving a signal being indicative for the actual rotational speed of the rotor of a wind turbine. A second input node 242 is used for receiving a signal being indicative for a reference rotational speed for the rotor. A third input node 243 is used for connecting the device 240 to an electricity network 290. The electricity network 290 is the same network in which the electrical power is fed, which is generated by the wind turbine.

A can be seen from FIG. 2, the reference signal being applied to the second input node 242 can represent (a) a time-independent rotational speed having a predefined nominal value (SpeedNom), (b) a time-independent rotational speed having a zero value (SpeedZero) or (c) a trigger signal which is used for initiating a ramping down of a speed reference being provided by a speed reference unit 248 starting from the predefined nominal value (SpeedNom) and ending at a zero value (SpeedZero). As can be further seen from FIG. 2, a switching unit 247 is provided in order to feed one of the three signals (a), (b) or (c) to a speed reference unit 248. A ramp function representing the ramp down behavior in case the trigger signal (c) is provided to the speed reference unit 248 is stored in the speed reference unit 248.

As can be furthermore seen from FIG. 2, a detection unit 245 is connected to the third input node 243. The detection unit 245 comprises a voltage detector 246, which is capable of detecting the voltage of the electricity network 290. In case there is detected a voltage drop, which is larger than a predefined dip, the detection unit 245 outputs a corresponding signal indicating the voltage drop. This signal is fed both to a timer unit 270 and to a pulse generator 260.

Immediately after receiving this signal indicating the voltage drop of the electricity network 290, the pulse generator 260 outputs a kick pulse 260a, which is supplied to an integral control element 256 of a control unit 250. In a parallel arrangement with respect to the integral control element 256 the control unit 250 also comprises a proportional control element 254.

According to the embodiment described here the control unit 250 is used for providing a reference signal for a blade pitch angle of the wind turbine based on the actual rotational speed of the rotor provided via the first input node 241 and based on a signal being indicative for a reference rotational speed for the rotor provided via the second input node 242. A value indicating the actual rotational speed of the rotor is subtracted from the speed reference provided by the speed reference unit 248 by means of a subtracting unit 252. The resulting value representing a speed error is fed both to the proportional control element 254 and the integral control element 256 of the control unit 250. The output of the proportional control element 254 and the output of the integral control element 256 are added by means of an adding unit 258. Thereby, a first pitch reference signal is generated, which is supplied to a selection unit 264.

The reception of the kick pulse leads to a step on the output of the integral control element 256. This step forces a fast movement of the blade pitch angle. In is mentioned that the kick pulse being applied to the integral control element has the same effect on the pitch reference output of the control unit 250 as a large negative speed error. The kick pulse 260a therefore acts to reduce the rotational speed of the rotor and thus contributes in preventing the wind turbine from an over speed situation.

As can be further seen from FIG. 2, the timer unit 270 is connected to a function generator 280. If the failure respectively the under voltage situation of the electricity network 290 last longer than a predefined time duration of for instance a 4 seconds, the time unit will output a stop command both to the function generator 280 and to an AND gate 272.

According to the embodiment described here, the AND gate 272 receives a second input from a comparator unit 274, which detects whether the actual speed is larger than the nominal speed. If this is the case the above described ramp function in the speed reference unit 248 is activated by the switching unit 247.

Figure 3:
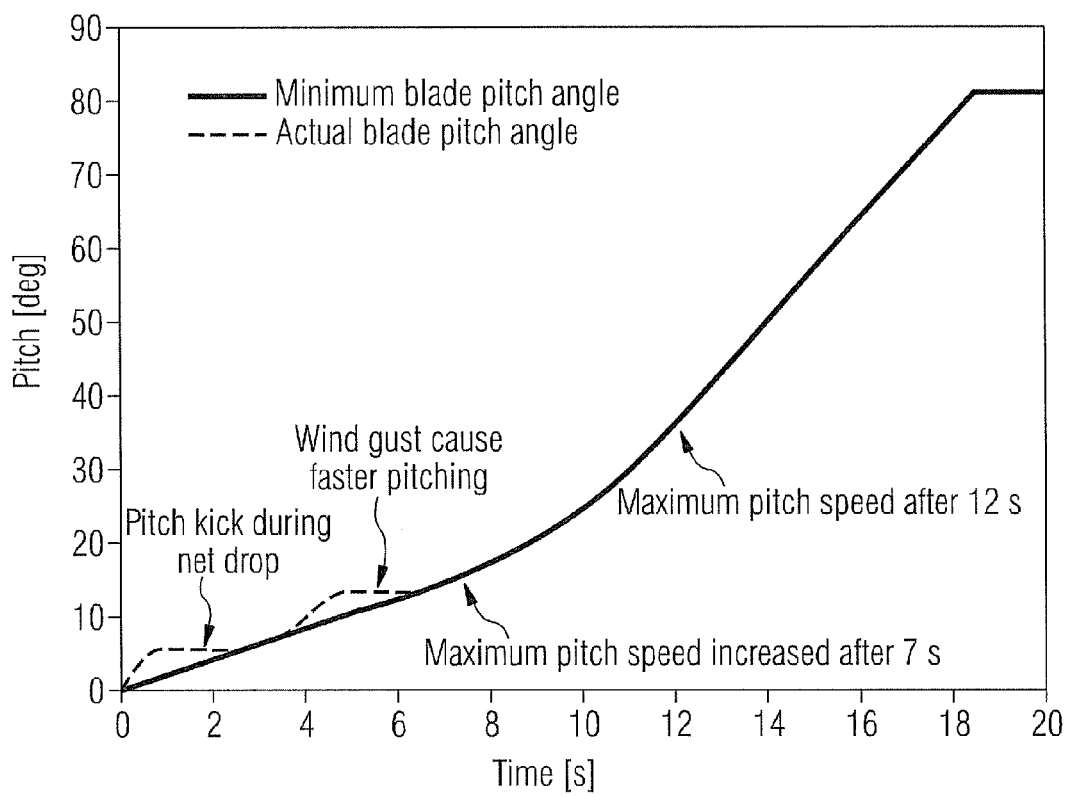

In response to the above described stop command the function generator 280 will output a time dependent function, which is indicative for a minimum pitch angle as a function of time after the reception of the stop command. This function, which is depicted in FIG. 3 as a full line, represents a second pitch reference signal.

The output signal provided by the function generator 280 is also supplied to the selection unit 264. The selection unit 264 selects the larger signal out of (a) the second pitch reference signal being provided by the function generator 280 and (b) the first pitch reference signal being provided by the adding unit as the final blade pitch reference signal (Pitch reference). This final blade pitch reference signal (Pitch reference) is present at an output node 288 of the rotational speed controlling device 240.

It is mentioned that in case there is only a very short fault on the electricity network 290, no stop command is issued. Instead an inverse kick pulse 260b is generated by the pulse generator 260 and is sent when the electricity network 290 condition has returned to normal. This forces a negative step on the integral control element 256 of the control unit 250 and will eliminate at least partially the blade pitch kick caused by the kick pulse 260a and having been sent when the electricity network 290 fault occurred.

It is noted that the rotational speed controlling device 240 may remain in operation even when a longer failure of the electricity network 290 occurs. This eliminates the need for a new start up procedure of the rotational speed controlling device 240 even if the wind turbine is completely stopped.

FIG. 3 shows a diagram depicting a variation of a blade pitch angle for a rotor of a wind turbine in response to the detection of a malfunction of an electricity network the wind turbine is connected to. As has already been mentioned above, the full line represents the second pitch reference signal provided by the function generator 280 depicted in FIG. 2. The dashed line represents the actual blade pitch angle.

As soon as the electricity network fault is detected the minimum pitch angle is slowly increased. At the same time the actual pitch angle is increased rapidly because of the pitch kick during net drop. If a wind gust causes the rotor speed to increase, the pitch angle increases again faster than the second pitch reference signal. If the rotor speed is decreasing faster than the speed reference, the blade pitch angle variation is limited by the minimum stop pitch angle.

As can be seen from FIG. 3, for the first 7 seconds after the electricity network fault has been detected, the minimum blade pitch angle varies relatively slowly. After 7 seconds the minimum blade pitch angle is varied more rapidly until the blade pitch angle reaches its final stop position approximately 18 seconds after the electricity network fault has been detected.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

By generating a kick pulse as soon as an electricity network fault occurs, the integral control element 256 forces a fast movement of the blade pitch angle.

One advantage of the described rotational speed controlling device and the described rotational speed controlling method is that a very quick reaction on an electricity network fault can be achieved. A further advantage is that the rotational speed controlling device remains active for a period after the fault occurs. Therefore, if the fault lasts only for a short duration of time, a new and lengthy start up procedure for the rotational speed controlling device is not needed.

If the electricity network fault lasts long, the fact that the rotational speed controlling device remains active insures that the wind turbine can be stopped in a controlled manner. This may reduce significantly the mechanical loads on the tower and the yaw system of the wind turbine.

The invention claimed is:

1. A device for controlling the rotational speed of a rotor of a wind turbine that feeds electrical power into an electricity network, the device, comprising:
   a first input node for receiving a first signal, the first signal is indicative of an actual rotational speed of the rotor;
   a second input node for receiving a second signal, the second signal is indicative of a reference rotational speed for the rotor;
   a detection unit for detecting a defective operational state in which the wind turbine is impeded to export electrical power to the electricity network;
   a control unit for providing a reference signal for a characteristic operational parameter of the wind turbine based on the first signal and based on the second signal, the characteristic operational parameter is indicative of the rotational speed of the rotor wherein the control unit includes a proportional control element and an integral control element; and
   a pulse generator connected to the output of the detection unit and to the integral control element and is adapted to send a kick pulse to the integral control element in response to the detection of the defective operational state.

2. The device as claimed in claim 1, further comprising a third input node for connecting the device to the electricity network,
wherein the detection unit is connected to the third input node, and
wherein the detection unit is adapted for detecting an electrical failure on the electricity network.

3. The device as claimed in claim 2, wherein the detection unit includes a voltage detector.

4. The device as claimed in claim 1, wherein the characteristic operational parameter of the wind turbine is a blade pitch angle of a blade of the rotor.

5. The device as claimed in claim 1, wherein the pulse generator is adapted to send an inverse kick pulse to the integral control element.

6. The device as claimed in claim 1, further comprising a timer unit, which is connected to the detection unit and which is adapted to provide a stop command signal to a function generator and an AND gate of the device.

7. The device as claimed in claim 1, wherein the reference rotational speed of the rotor is selected from the group consisting of a time-independent rotational speed having a predefined nominal value, a time-independent rotational speed having a zero value, and a time-dependent rotational speed having a predefined time dependency which is started in response to the stop command signal.

8. The device as claimed in claim 1,
wherein the control unit includes a subtracting unit for obtaining a rotational speed error by subtracting the first signal from the second signal, and
wherein the rotational speed error is provided to the proportional control element and to the integral control element.

9. The device as claimed in claim 1, wherein the device is realized using a computer program, an electronic circuit, or a combination of software and hardware modules.

10. A wind turbine for generating electric power, the wind turbine comprising
a rotor including a blade, the rotor is rotatable around a rotational axis and the blade extends radially with respect to the rotational axis;
a generator mechanically coupled to the rotor, the generator generates electrical power from a rotational movement of the rotor; and
a device for controlling the rotational speed of the rotor, the device comprising:
a first input node for receiving a first signal, the first signal is indicative of an actual rotational speed of the rotor;
a second input node for receiving a second signal, the second signal is indicative of a reference rotational speed for the rotor;
a detection unit for detecting a defective operational state in which the wind turbine is impeded to export electrical power to the electricity network;
a control unit for providing a reference signal for a characteristic operational parameter of the wind turbine based on the first signal and based on the second signal, the characteristic operational parameter is indicative of the rotational speed of the rotor wherein the control unit includes a proportional control element and an integral control element; and
a pulse generator connected to the output of the detection unit and to the integral control element and is adapted to send a kick pulse to the integral control element in response to the detection of the defective operational state.

11. The wind turbine as claimed in claim 10, further comprising an uninterruptible power supply which is connected to the device for controlling the rotational speed of the rotor.

12. The wind turbine as claimed in claim 10,
wherein the device comprises a third input node for connecting the device to the electricity network,
wherein the detection unit is connected to the third input node, and
wherein the detection unit is adapted for detecting an electrical failure on the electricity network.

13. The wind turbine as claimed in claim 10, wherein the detection unit includes a voltage detector.

14. The wind turbine as claimed in claim 10, wherein the characteristic operational parameter of the wind turbine is a blade pitch angle of a blade of the rotor.

15. The wind turbine as claimed in claim 10, wherein the pulse generator is adapted to send an inverse kick pulse to the integral control element.

16. The wind turbine as claimed in claim 10, further comprising a timer unit, which is connected to the detection unit and which is adapted to provide a stop command signal to a function generator and an AND gate of the device.

17. The wind turbine as claimed in claim 10, wherein the reference rotational speed of the rotor is selected from the group consisting of a time-independent rotational speed having a predefined nominal value, a time-independent rotational speed having a zero value, and a time-dependent rotational speed having a predefined time dependency which is started in response to the stop command signal.

18. The wind turbine as claimed in claim 10,
wherein the control unit includes a subtracting unit for obtaining a rotational speed error by subtracting the first signal from the second signal, and
wherein the rotational speed error is provided to the proportional control element and to the integral control element.

19. The wind turbine as claimed in claim 10, wherein the device is realized using a computer program, an electronic circuit or a combination of software and hardware modules.

20. A method for controlling the rotational speed of a rotor of a wind turbine that feeds electrical power into an electricity network, the method comprising:
receiving a first signal, the first signal indicative of an actual rotational speed of the rotor;
receiving a second signal, the second signal indicative of a reference rotational speed for the rotor;
detecting a defective operational state in which the wind turbine is impeded to export electrical power to the electricity network;
providing a reference signal for a characteristic operational parameter of the wind turbine based on the first signal and based on the second signal, the characteristic operational parameter is indicative of the rotational speed of the rotor;
sending a kick pulse from a pulse generator to an integral control element of a control unit; and
integrating the kick pulse such that the reference signal for the characteristic operational parameter of the wind turbine is changed in response to the detection of the defective operational state, the change of the reference signal causes the rotor to change its rotational speed.

* * * * *